UNITED STATES PATENT OFFICE 2,416,295

GASKET MATERIAL AND METHOD OF MAKING THE SAME

George E. Ehle, Lancaster Township, Lancaster County, Pa., assignor to Armstrong Cork Company, Lancaster, Pa., a corporation of Pennsylvania No Drawing. Application August 24, 1943, Serial No. 499,871

9 Claims. (Cl. 288—34)

This invention relates to a gasket material and method of making the same and, more particularly, to a gasket which may be successfully used with magnesium and aluminum, and their alloys to prevent or inhibit the corrosion which normally occurs. One of the most commonly used gasket materials consists of a body of fibers, such as kraft paper fibers, leather fibers, or a combination of these, impregnated and filled with a plasticized gelatin composition such as a glue-glycerine saturant. This material is readily compressible, is elastic and resilient to the desired degree, and is resistant to attack by a wide range of organic solvents. It possesses physical and chemical characteristics which make it a good gasketing material. However, when such a gasket material is used between magnesium alloy aircraft parts, for example, a corrosion of the alloy takes place, due, it is believed, to an electrolytic action. Electrolysis takes place only in the presence of water and, since both the glue and glycerin have an affinity for moisture, the corrosion is aggravated by their presence in the gasket. Unsaturated paper gaskets likewise produce a similar result because of the moisture absorptive qualities of the paper. The same problem exists with cork composition gaskets, for the binder for the cork particles, commonly a glue-glycerine or plasticized synthetic resin mixture, is water retentive. The cork particles themselves will take on a small amount of moisture, although considerably less than a fibrous base. The corrosion problem is not acute where ferrous metals are sealed, but with the advent of extensive use of the lighter metal alloys where corrosion is a major factor, as in the present aircraft uses, the employment of gasket materials which are not absolutely proof against the absorption or retention of moisture has caused considerable concern.

Prior attempts to solve the corrosion problem have proceeded on the theory of shielding or exclusion; that is, an impermeable barrier has been set up between the metal surface to be sealed and the sealing material. One worker in this field has suggested the use of a thin metal foil sheet as a facing for the gasket, thus protecting the part to be sealed against attack resulting from the presence of the gasket material in the assembly. The use of metal foil presents other problems, for the sealing surface is completely altered when a metal foil sheet is interposed between the gasket and the part to be sealed. The sealing deficiency is especially noticeable if the surface to be sealed is not ground smooth and true. Another attempt to solve the problem proceeded along the same path and suggested the use of a coating material for the gasket, such as a lacquer, in an attempt to obtain an impervious layer between the gasket proper and the surface to be sealed. It is well nigh impossible to apply a thin coating of lacquer or similar material to a rough, irregular surface such as that normally present in a fibrous gasket without obtaining pinholes or other openings which extend through the thickness of the coating. Cracking or flaking of the coating will result in corrosion where such areas overlie the metal surface. When a coating of a thickness sufficient to form an effective barrier is applied, then the physical characteristics of the gasketing material are affected and a poor seal results.

My invention is concerned with reducing or substantially eliminating corrosion without altering the sealing characteristics of the gasket material. I have proceeded contrary to the general theory, presenting at the sealing surface a material which is water soluble to a slight extent but I utilize the effect of a chemical reaction taking place in the presence of moisture to inhibit or eliminate corrosion. A chemically reactive material is used; one that has a sphere of activity outside the boundaries of the material itself, thus making possible the use of gasketing materials such as fibrous base gasket stock, cork compositions, and the like, where a non-planar sealing surface is present, without even attempting to shield the surface or render it proof against moisture. The problems resulting from change in the sealing characteristics of the gasketing material are obviated and the cause of corrosion is harnessed to provide a chemical mechanism which will protect the light metal alloys against corrosion.

I have discovered that by providing particles of a slightly soluble chemically reactive material known as basic zinc chromate at the interface between the gasket and the metal to be sealed, corrosion is inhibited or eliminated in both magnesium and aluminum alloys provided the basic zinc chromate is exposed at the interface so that it may be acted upon by any moisture present to produce the corrosion inhibiting chemical action. Basic zinc chromate has a sphere of activity outside its boundaries and, because of this phenomenon, the particles may be in the form of a discontinuous coating without detracting from the corrosion inhibiting effect. Such spacing as would inevitably occur in applying an infinitesimal quantity of a dispersion of the material to the exposed surface of a fibrous gasket stock apparently renders the product nonetheless effective. This activity is of importance also because it permits the use of such small amounts of material as do not alter the sealing characteristics of the gasket. The flexibility, resilience, and compressibility of the gasket are not measurably changed. Since the chemical reactivity of the basic zinc chromate which inhibits corrosion proceeds only in the presence of moisture which causes a dissociation into zinc and chromate ions, the moisture in the gasket stock is availed of to obtain corrosion resistance—the curse becomes a virtue. Gasket materials which include glue, glycerine, or other binder ingredients which have an affinity for water give particularly good results with aluminum and magnesium alloys where heretofore they have been rejected because they have caused corrosion.

I will describe my invention more specifically in connection with a gasket stock formed of leather fibers and kraft paper fibers formed into a sheet on a Fourdrinier machine and subsequently saturated with a binder composed of glue and glycerine.

Example I

The treating composition may be prepared by suspending the basic zinc chromate in water, using 20 parts by weight of basic zinc chromate to 80 parts by weight of water, utilizing a pebble mill to effect the dispersion of the basic zinc chromate in the water.

The web of gasketing material is preferably fed through a trough containing the dispersed basic zinc chromate and excess treating material is removed by doctor blades. Since the gasket is well permeated with the glue-glycerine binder, there is no substantial penetration of the basic zinc chromate into the body. It does, however, lie below the fiber ends which are exposed at the surface of the gasket material and in any surface depressions which may be present.

The sheet is then fed to a hydraulic platen press where pressure in the order of about five pounds per square inch is applied to the sheet. The press platens are preferably heated from about 250° F. to 300° F. The glue-glycerine binder in the gasket stock under consideration is of a slightly thermoplastic nature and upon the application of heat and pressure the basic zinc chromate is bonded to the surface both by the mechanical effect of pressing down the fiber ends and the adhesive action of the glue-glycerine binder.

The finished sheet exhibits the yellowish color of the basic zinc chromate particles which are exposed at the surface, but the coating is not opaque; the brownish color of the gasket stock shows through. When viewed under a microscope, it is apparent that the particles of basic zinc chromate are not deposited as a continuous film and many particles are separated by the width of the fibers which lie between them. Very satisfactory results have been obtained where only eight grams of basic zinc chromate have been applied per square yard of surface area.

It may be desirable in some instances, particularly where the natural bonding effect of the saturant of the gasket stock or mechanical bonding by the exposed fiber ends of the gasket stock are not available, to provide a small amount of binder in the basic zinc chromate treating composition.

Example II

A treating composition prepared as follows is suitable for use on a cork composition gasket, all parts being given by weight:

| | |
|---|---|
| Basic zinc chromate | 20 |
| Dry casein | 2 |
| Ammonia | .06 |
| Fungicide | .02 |
| Water | 78 |

This composition is prepared by dissolving the casein in the water with mild heat, with the ammonia assisting in the dissolution. The fungicide, which may be "Dowicide G" or other similar material, is incorporated into the dissolved casein. The basic zinc chromate is then added and mixing in a pebble mill is effected until a substantially uniform dispersion is obtained. In treating the gasket material, the procedure outlined above in connection with the fibrous gasket stock may be followed. The treating composition may be also sprayed or brushed onto the cork composition or similarly applied. With this treating composition the casein is more or less insolubilized upon the application of heat and pressure and the basic zinc chromate particles are firmly affixed to the surface of the gasket material. The amount of casein is so small that a major portion of the basic zinc chromate particles are available for reaction at the surface. In addition, thin films of casein are readily penetrated by moisture and, as soon as moisture is made available to the basic zinc chromate particles, their chemical reactivity commences and the corrosion inhibiting action obtains. The effect, therefore, is that all of the basic zinc chromate particles at the surface are available for reaction. Where a binder is incorporated, it is preferred to use one which may be readily permeated by the moisture necessary to effect the chemical reaction. Glue and casein are particularly good because of their affinity for water.

The amount of basic zinc chromate applied to the gasketing material will depend in a measure at least upon the planeness of the sealing surface. Where a cork composition is used which is close and dense with few small surface openings, a very small amount of treating material is required. With cork compositions having a relatively small amount of binder and larger cork particles compressed to a lesser density with resulting larger and more numerous surface openings, additional coating composition must be applied. The same is true of various fibrous gasket materials. The quantity of coating composition applied to obtain maximum corrosion resistance should be sufficient that the spheres of activity of adjacent particles are at least contiguous or overlap so as to provide complete protection for the entire surface of the metal in contact with the gasket. The fact that some of the particles are spaced by fibers which are disposed at the surface indicates that the sphere of activity is appreciable. In order to preserve the sealing characteristics of the surface of the gasketing material, an amount approaching the minimum required for complete protection against corrosion is preferably used.

Particularly good results are obtained with the use of a small amount of casein or glue as a binder for the basic zinc chromate particles when the gasket stock itself has a binder of glue-glycerine in which the glue is tanned and in which an excess of the tanning material is present. For example, in the material referred to in the first example, the leather and kraft paper fiber gasket stock may be saturated with a glue-glycerine binder and a dichromate, such as the alkali metal dichromates, and more specifically sodium dichromate, used to tan the binder. If an excess of dichromate is employed, then, upon the application of heat and pressure to a casein bound zinc chromate treating composition as in Example II, the casein will be tanned by the free dichromate, induced by heat and the application of pressure. It is not essential in my process that heat be employed. Beneficial results are obtained from the use of heat and since it also results in the creation of an improved surface on the gasket material, I prefer to employ it.

In the examples given above, fibrous organic materials and cork have been recited as forming the base of the gasketing material. My invention is not limited to any particular gasket stock. It is useful with gaskets formed of organic fibers such as those previously recited, inorganic fibers, such as asbestos and the like, cork, or similar woody materials. In fact, the invention is applicable to all gasket materials which are capable of absorbing or retaining moisture and which have a sealing surface capable of receiving the particles of basic zinc chromate in such spaced relationship that their spheres of activity are at least contiguous throughout substantially the entire area which will form the interface between the gasket and the part to be sealed.

While I have illustrated and described the preferred embodiment of my invention, it will be understood that the same may be otherwise embodied and practiced within the scope of the following claims.

I claim:

1. A gasket for sealing light metals or alloys thereof where moisture is likely to be present at the interface between the gasket and the metal surface to be sealed and result in corrosion comprising a base stock of leather fibers saturated with a glue-glycerine binder having affinity for moisture, said stock having a nonplanar sealing surface resulting from fiber ends disposed at such surface, particles of basic zinc chromate carried by said base stock and disposed throughout the extent of the sealing surface to form substantially the entire interface with the metal part to be sealed, substantially all of said particles which will constitute the interface being exposed for contact with moisture at the interface and effective upon such contact with moisture to dissociate into the zinc and chromate ions, the spheres of activity of which are sufficient to effectively protect the entire surface area of the metal part in contact with said surface against corrosion resulting from the occurrence of moisture, and a dried, water pervious tanned adhesive joining said particles to said base stock.

2. A gasket in accordance with claim 1 in which the adhesive is tanned by an alkali metal dichromate present in the glue-glycerine binder for the base stock.

3. A gasket for sealing light metals or alloys thereof where moisture is likely to be present at the interface between the gasket and the metal surface to be sealed and result in corrosion comprising a base stock formed principally of leather fibers saturated with a binder of glue and glycerine having affinity for moisture, said stock having a nonplanar sealing surface resulting from fiber ends disposed at the surface, particles of basic zinc chromate disposed throughout the extent of the sealing surface to form substantially the entire interface with the metal part to be sealed with certain of said particles spaced by fibers disposed therebetween at the sealing surface, said zinc chromate particles being exposed at the sealing surface for contact with moisture at the interface and effective upon such contact with moisture to dissociate into zinc and chromate ions within spheres of activity sufficient to effectively protect the entire surface area of the metal part in contact with said surface against corrosion resulting from the occurrence of moisture, and a dried thin water pervious film of casein bonding said basic zinc chromate particles to the base stock.

4. In a method of making a gasket for sealing light metals or alloys thereof where moisture is likely to be present at the interface between the gasket and the metal surface to be sealed and result in corrosion, the steps of applying a liquid dispersion of basic zinc chromate particles to the sealing surface of a hygroscopic base stock to deposit the zinc chromate particles in exposed condition for dissociation upon contact with moisture and in such spaced relationship at the sealing surface that they are effective upon contact with moisture to dissociate into zinc and chromate ions within spheres of activity at least contiguous to one another throughout the entire area of the sealing surface thereof, and thereafter applying pressure to said particles to press them into the sealing surface and mechanically bond the same to the base stock.

5. In a method of making a gasket for sealing light metals or alloys thereof where moisture is likely to be present at the interface between the gasket and the metal surface to be sealed and result in corrosion, the steps of applying a water dispersion of basic zinc chromate particles to the nonplanar sealing surface of a hygroscopic fibrous base gasket stock having fiber ends terminating in the sealing surface, removing excess dispersion from the surface leaving certain of the basic zinc chromate particles separated by fibers disposed therebetween at the sealing surface with the zinc chromate particles in exposed condition for dissociation with moisture, and thereafter applying pressure to said stock to press said fiber ends into the sealing surface, separating other particles of basic zinc chromate and bonding the basic zinc chromate particles to the base stock in such spaced relationship that they are effective upon contact with moisture to dissociate into zinc and chromate ions within spheres of activity at least contiguous to one another throughout the entire area of the sealing surface of the gasket to effectively protect the metal part in contact with said sealing surface against corrosion.

6. In a method of making a gasket for sealing light metals or alloys thereof where moisture is likely to be present at the interface between the gasket and the metal surface to be sealed and result in corrosion, the steps of applying a water dispersion of basic zinc chromate particles to the sealing surface of a fibrous base gasket stock saturated with a glue-glycerine binder, and applying heat and pressure to said stock to bond said particles to said stock with the aid of the glue-glycerine binder.

7. In a method of making a gasket for sealing light metals or alloys thereof where moisture is likely to be present at the interface between the gasket and the metal surface to be sealed and result in corrosion, the steps of applying a liquid dispersion of basic zinc chromate particles and a protein adhesive capable of being tanned to the sealing surface of a fibrous base gasket stock saturated with a tanned glue-glycerine binder, there being free tanning agent present in the binder, and applying heat and pressure to said gasket stock to set said adhesive and tan the same by reaction with said free tanning agent.

8. In a method of making a gasket for sealing light metals or alloys thereof where moisture is likely to be present at the interface between the gasket and the metal surface to be sealed and result in corrosion, the steps of applying a dispersion of basic zinc chromate particles in a water solution of casein to the sealing surface of a leather fiber base gasket stock saturated with a glue-glycerine binder and having fiber ends terminating in the sealing surface, removing excess treating solution and leaving certain of the fiber ends uncoated, applying heat in the order of 250° F. to 300° F. to said stock simultaneously with the application of pressure and thereby joining said basic zinc chromate particles to said stock at the sealing surface with certain, at least, of said particles being in spaced relationship at the sealing surface and pressing said fiber ends into the sealing surface of the gasket to provide exposed particles of basic zinc chromate disposed at the sealing surface to form substantially the entire interface wtih the metal part to be sealed.

9. A gasket for sealing light metals or alloys thereof, where moisture is likely to be present at the interface between the gasket and the metal surface to be sealed and result in corrosion, comprising a base material capable of absorbing or retaining moisture bound with a hygroscopic glue-glycerine binder, particles of basic zinc chromate carried by said base material and disposed throughout the extent of the sealing surface to form substantially the entire interface with the metal to be sealed, substantially all of said particles which will constitute the interface being exposed for contact with moisture at the interface and effective upon such contact with moisture to dissociate into zinc and chromate ions, the spheres of activity of which are sufficient to effectively protect the entire surface area of the metal part in contact with the said surface against corrosion resulting from the occurrence of moisture, and a dried, water-pervious, protein adhesive joining said particles to the base material.

GEORGE E. EHLE.

REFERENCES CITED

The following references are of record in the file of this patent:

UNITED STATES PATENTS

| Number | Name | Date |
|---|---|---|
| 2,055,471 | Balfe | Sept. 29, 1936 |
| 2,208,619 | Armor et al | July 28, 1940 |